United States Patent [19]

Fillmore

[11] 3,908,209

[45] Sept. 30, 1975

[54] FLUID DISPENSING APPARATUS

[75] Inventor: William E. Fillmore, Toledo, Ohio

[73] Assignee: Owens-Illinois, Inc., Toledo, Ohio

[22] Filed: Apr. 15, 1974

[21] Appl. No.: 460,946

[52] U.S. Cl. .......................... 4/227; 4/228; 222/56; 222/57
[51] Int. Cl............................ E03d 9/02; E03d 9/03
[58] Field of Search ....... 4/222, 227, 228, 231, 224, 4/223; 222/57, 56

[56] References Cited
UNITED STATES PATENTS

| | | | |
|---|---|---|---|
| 2,967,310 | 1/1961 | O'Hara | 4/227 |
| 3,698,021 | 10/1972 | Mack et al. | 4/227 |
| 3,766,570 | 10/1973 | Finnaran | 4/222 |
| 3,774,808 | 11/1973 | LaVange | 4/227 X |
| 3,778,850 | 12/1973 | Bryan | 4/227 |
| 3,841,524 | 10/1974 | Easter | 4/227 X |

*Primary Examiner*—Henry K. Artis
*Attorney, Agent, or Firm*—Steve M. McLary; Edward J. Holler

[57] ABSTRACT

A dispensing package for releasing metered quantities of fluid into the flush tank of a toilet. The package includes a fluid container which has an open neck portion. A stationary guide member is secured in the neck. A float member is slideably mounted on the guide member. The entire package is mounted in the flush tank of a toilet with the float member in contact with the water in the tank at the normal high water level. At the high water level, the float member and the guide member are in a first sealing position, thus preventing escape of the fluid in the container. When the tank is emptied, the float member moves downward to a second sealing position. During movement between the first and second sealing positions, a metered quantity of fluid is trapped between two spaced-apart sealing surfaces on the float member. This metered quantity of fluid is dispensed into the tank as the second sealing position is reached.

13 Claims, 5 Drawing Figures

FLUID DISPENSING APPARATUS

BACKGROUND OF THE INVENTION

This invention generally relates to fluid dispensing packages. More particularly, this invention relates to packages for dispensing a metered quantity of a cleaning fluid into the flush tank of a toilet. Specifically, this invention relates to a dispensing package of the character described in which the fluid is dispensed upon the fall of the water level in the flush tank.

The prior art gives many examples of dispensing packages for metering a cleaning fluid into the flush tank of a toilet. The following U.S. Pats. are illustrative: U.S. Pat. Nos. 2,913,734; 2,967,310; and 3,698,021. However, there is always a desire to find a dispensing package that is less expensive and more effective than those of the prior art. One particular deficiency in the prior art dispensers is that of inaccurate metering when they are tipped slightly. I have invented a dispensing package which uses molded plastic components that are relatively easily and cheaply made, but which still, when assembled, perform accurately and repeatably. In addition, my package has no molded metering chamber per se, but rather forms a chamber each time the float member falls to give a positive metering function that is not affected by tipping the package.

SUMMARY OF THE INVENTION

My invention is a package for dispensing a metered amount of fluid in a toilet flush tank. The package includes a container for the fluid, the container having a body portion and a neck portion defining an opening into the container. A stationary guide member is secured in the neck and fills the opening in the neck. The guide member includes a seal wall which defines an opening communicating with the contents of the container. A float member is slideably mounted on the guide member. The float member includes two longitudinally spaced-apart sealing surfaces for sealingly engaging the seal wall in a first and a second sealing position. A means for mounting the entire package in the flush tank with the float member downward is also provided. The float member will be in the first sealing position when the tank is full and will move to the second sealing position when the tank is emptied. This will allow dispensing into the tank a metered quantity of fluid trapped between the first and second sealing surfaces during movement from the first to the second sealing position.

DETAILED DESCRIPTION OF THE DRAWINGS

Figure 1:
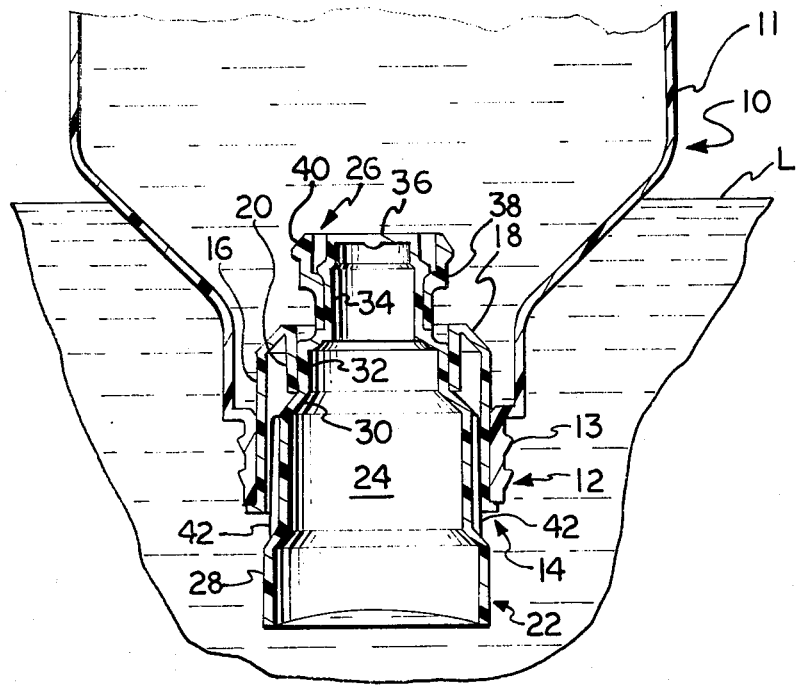
FIG. 1 is a cross-sectional elevational view of the dispensing package of the present invention in position in a filled flush tank.

In FIG. 1, the dispensing package of the present invention is shown in its operational position. A container 10 having a body portion 11 and a neck portion 12 defining an opening into the container is shown in an inverted position in the flush tank of a toilet. The neck portion 12 may include a threaded finish portion 13. The container 10 may be made of glass, plastic, metal or a composite material. A stationary guide member 14 is secured in the neck portion 12 and fills the opening in the neck. The guide member includes a skirt portion 16 which extends inwardly toward the contents of the container 10. It should be noted that the stationary guide member 14 is secured in the neck 12 in the manner of a cork. That is, the engagement is basically a frictional type engagement in the embodiment shown in FIG. 1. However, if desired, the stationary guide member 14 may have a snap-type annular rim formed thereon which will allow it to be snapped into position in a groove formed in the neck 12. This type of attachment is well known in the art in such devices as pour out fitments, and is therefore not shown since the modification to this particular type of arrangement should be clear to one skilled in the art. The skirt portion 16 terminates in an inwardly extending flange portion 18. Attached to the end of the flange portion 18 and extending toward the container opening is an integral sealing wall 20. The sealing wall 20 defines an opening into the interior of the container 10.

Slideably mounted on the stationary guide member 14 is a float member 22. The float member 22, as illustrated in FIG. 1, is actually a two-piece construction, as will be explained later, but could be formed as an integral element if so desired. However, molding techniques are such that an undesirable seam line appears in the float member 22 when formed as a unitary element, and the two-piece assembly is preferred to ensure proper sealing. The float member 22, as shown in FIG. 1, is made up of two major components: a movable metering member 24 which is slideably engaged in the opening defined by the sealing wall 20, and a sealing ring 26 which is carried by the movable metering member 24. The metering member 24 has a lower, hollow annular portion 28. A stop ledge 30 is connected to the hollow annular portion 28 and merges with a seal portion 32. The seal portion 32 is then connected to an extension portion 34 on which the sealing ring 26 is actually mounted. Note that a disc member 36 completely seals the metering member 24 to prevent entry of any of the contents of the container 10 into the hollow interior of the metering member 24. The sealing ring 26 includes a seal surface 38 and a stop rib 40 which extends radially beyond the seal surface 38 to provide a function to be explained with respect to FIG. 3.

The metering member 24 may also include a plurality of longitudinally extending ribs 42 which may be integrally formed with the hollow annular portion 28 of the metering member 24. The ribs 42 extend radially to be in sliding contact with the skirt 16 of the stationary guide member 14. This sliding contact ensures control of the float member 22 as it moves up and down in response to the movement of water within the flush tank.

The position of the float member 22 shown in FIG. 1, is the position that would be assumed when the flush tank is filled with water. Note the water level indicated as L in FIG. 1. With the water at this level, the water will enter the hollow float member 22 and compress the air therein, thus forcing the hollow float member 22 upward into a first sealing position in which the seal portion 32 is in fluid sealing engagement with the sealing wall 20. The stop ledge 30 contacts the sealing wall 20 to prevent further movement of the float member 22 beyond this first sealing position. In this position, the contents of the container 10 may not escape past the seal formed by the sealing wall 20 and the seal portion 32. When water is drained from the flush tank, the float member 22 may move downward by force of gravity and will assume the position shown in FIG. 3. In this position, which may be designated a second sealing position, the seal surface 38 of the sealing ring 26 is in fluid sealing engagement with the sealing wall 20. It should also be noted that the seal portion 32 has now moved below or out of sealing engagement with the sealing wall 20, thus permitting fluid which was previously trapped between the sealing wall 20 and the seal portion 32 to drain in the tank.

Figure 2:
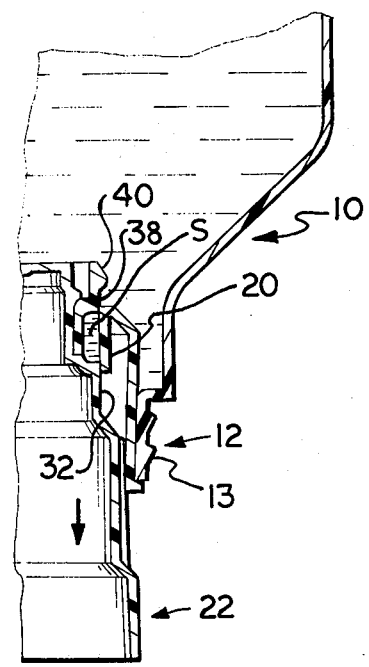
FIG. 2 is a view of a portion of FIG. 1 showing the trapping of a metered quantity of fluid as the float member falls in response to the fall of water level in the tank.
Figure 3:
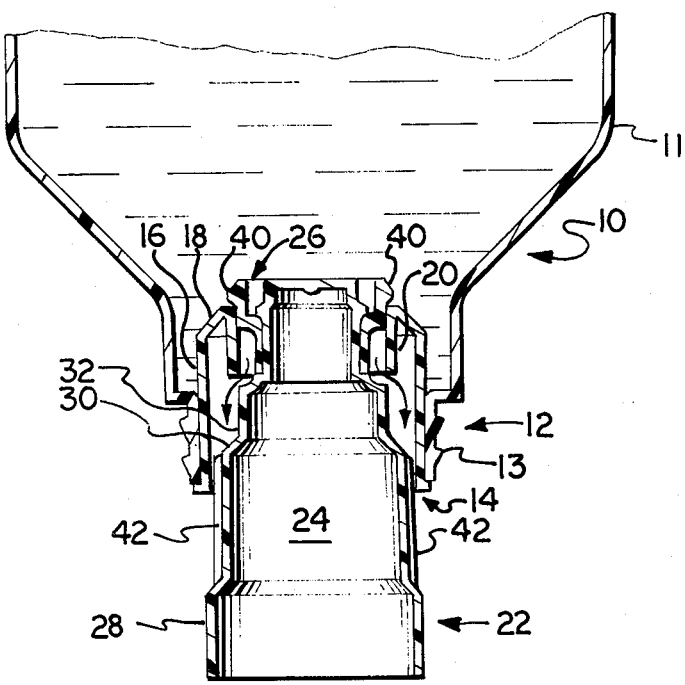
FIG. 3 is a view similar to FIG. 1 showing the dispensing package of the present invention in the configuration assumed when the tank is emptied.

FIG. 2 illustrates how a metered quantity of the contents of the container 10 is positively measured and dispensed during the movement from the first sealing position shown in FIG. 1 to the second sealing position shown in FIG. 3. The longitudinal separation of the seal surface 38 and the seal portion 32 is selected such that one or the other is always in sealing engagement with the sealing wall 20 of the stationary guide member 14. However, FIG. 2 clearly shows that there is one position during the movement from the sealing position of FIG. 1 to the sealing position of FIG. 3 in which there is an annular space, designated as S in FIG. 2, formed between the lower portion of the sealing ring 26 and the sealing wall 20. FIG. 1 clearly shows that in the first sealing position, the contents of the container 10 are in communication with the upper portion of the sealing wall 20. As the float member 22 begins to move downward, the material still remains in communication with this area. At the time the seal surface 38 of the sealing ring 26 first comes into contact with the upper portion of the sealing wall 20, a measured quantity of the contents of the container 10 will be trapped in the annular space designated as S. As the float member 22 continues its downward movement to the second sealing position shown in FIG. 3, this material trapped in the space S will be dispensed or will be allowed to flow over the float member 22. Note in FIG. 3 that the stop rib 40 is in contact with the sealing wall 20. This engagement acts to prevent further movement of the float member 22 beyond the second sealing position. The longitudinally extending ribs 42, which are spaced apart about the periphery of the hollow annular portion 28, allow this material to run downward and into the water which is leaving the flush tank. This then allows the dispensing of a measured quantity of the disinfecting or cleaning material, which is the contents of the container 10, into the water used for flushing.

In the actual operational environment of this dispenser, the first sealing position is an upper sealing position and the second sealing position is a lower sealing position. Thus, the float member 22 is a movable member which reciprocates between an upper and a lower sealing position as a function of the water level in a flush tank. Then, the stationary guide member 14, and more particularly its sealing wall 20, cooperates with the sealing ring 26 and the seal portion 32 to form a means for trapping and dispensing a measured quantity of fluid during movement of the float member 22 from the upper to the lower position. The dispensing occurs as the float member 22 reaches the lower position.

As the flush tank refills, the float member 22 moves upward until it reassumes the first sealing position shown in FIG. 1. Note that as this upward movement begins, the intermediate position shown in FIG. 2 will also be attained during the upward movement, but since there is always a sealing engagement between the sealing wall 20 and either the seal portion 32 or the seal surface 38, the contents of the container 10 are not allowed to escape during this movement to the first sealing position. Only during the emptying of the flush tank is the metered quantity of the material within the container 10 dispensed. The movement back to the first sealing position traps a quantity of air in the space S and causes this to be released into the container 10. This then replaces the fluid removed with an equal volume of air and thus prevents a vacuum from forming in the container 10, the formation of a vacuum leading to possible dispensing inaccuracy or total failure of operation.

Figure 4:
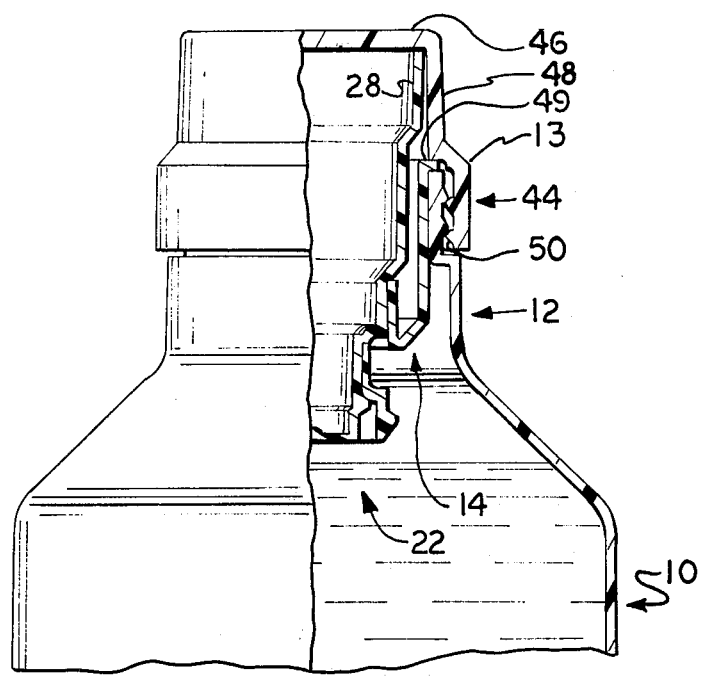
FIG. 4 is an elevational view, partially in cross-section, showing the dispensing package of the present invention with a closure attached thereto for storage or shipment.

FIG. 4 shows the dispensing package of the present invention in its storage or shipment configuration. A closure 44 has an upper disc member 46 integrally connected to a depending skirt 48. The skirt 48 is formed with threads 50 on the inner surface thereof. The threads 50 engage with the threaded finish 13 and then allow the closure 44 to be secured to the container 10. The disc member 46 engages the hollow annular portion 28 of the float member 22 and forces the float member 22 into the previously described first sealing position with the stationary guide member 14. The closure 44 also may include a sealing ledge 49. The ledge 49 rests on the upper end of the stationary guide member 14. The guide member 14 may be made of a relatively soft plastic, such as polyethylene, and the closure member 44 of a somewhat harder plastic material. Thus, the sealing ledge 49 may compress the guide member 14 in the manner of a gasket and further seal the package, thereby giving a dual seal arrangement for positive leakage protection. The closure 44 therefore keeps the contents of the container 10 sealed until used. To use the dispensing package, the closure 44 is removed and the container 10 is inverted into a toilet flush tank, as shown in FIG. 5.

Figure 5:
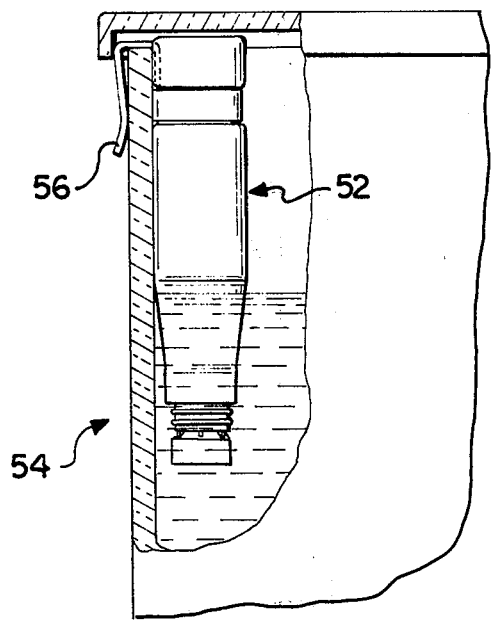
FIG. 5 is an elevational view, partially in cross-section, showing the mounting of the dispensing package of the present invention in a toilet flush tank.

In FIG. 5, the completed dispensing package, generally designated as 52, is shown inverted in a toilet flush tank 54. The package 52 is positioned so that the float member 22 is in contact with the water in the tank at the high level or full point of the tank. In addition, the hollow annular member 28 should be placed deep enough in the water to provide a buoyant force on the float member 22 at the high level point to force the float member 22 into the previously described first sealing position. A mounting bracket 56 is attached to the package 52, hangs onto a wall of the tank 54 and supports the package 52 with the float member 22 downward.

I claim:
1. Apparatus for dispensing metered amounts of fluid, which comprises, in combination:

a container for said fluid, said container including a body portion and a neck portion defining an opening into said container;

a stationary guide member secured in said neck and filling the opening in said neck, said guide member including a skirt portion extending into said container, an inwardly extending flange portion integrally formed with the end of said skirt portion, and a sealing wall, attached to the end of said flange portion, extending toward said container opening and defining an opening communicating with the contents of said container;

a movable metering member, slideably engaged in said opening defined by said sealing wall, said movable metering member including a hollow annular portion with a diameter less than the diameter of said skirt portion of said guide member and extending beyond said container opening, a seal portion forming a fluid tight seal with said sealing wall when said hollow annular portion is moved toward said container opening to a first sealing position, and an extension portion projecting beyond said seal portion and being closed to prevent the contents of said container from entering said movable metering member; and a sealing ring, carried by said extension portion, said sealing ring forming a fluid tight seal with said sealing wall when said hollow annular portion is moved away from said container opening to a second sealing position, a measured quantity of fluid being trapped between said sealing ring and said seal portion as said hollow annular portion is moved between said first and said second sealing position, said trapped fluid being expelled around said hollow annular portion as said second sealing position is reached.

2. The apparatus of claim 1 wherein said movable metering member further includes:

a plurality of longitudinally extending ribs, integrally formed on the periphery of said hollow annular portion and being spaced apart thereon, said ribs extending radially and being in sliding contact with said guide member to thereby control the movement of said movable metering member in response to the movement of said movable metering member to and from said first sealing position.

3. The apparatus of claim 1 wherein said sealing ring further includes:

a stop rib, extending radially beyond said sealing ring, positioned to engage said sealing wall at said second sealing position and thereby prevent further movement of said movable metering member beyond said second sealing position.

4. The apparatus of claim 1 wherein said metering member further includes:

a stop ledge, connecting said hollow annular portion and said seal portion, for engaging said sealing wall at said first sealing position and thereby prevent further movement of said movable metering member beyond said first sealing position.

5. The apparatus of claim 1 wherein said neck portion includes an externally threaded finish portion, and which further includes:

a closure having an interiorly threaded depending skirt integrally connected with a disc portion, said closure being threadably engaged with said finish portion, said disc portion contacting said movable metering member and holding said movable metering member in said first sealing position until said closure is removed to allow dispensing of the contents of said container.

6. A package for dispensing a metered amount of fluid into a toilet flush tank which comprises, in combination:

a container for said fluid, said container including a body portion and a neck portion defining an opening into said container;

a stationary guide member secured in said neck and filling the opening in said neck, said guide member including a sealing wall defining an opening communicating with the contents of said container;

a float member, slideably mounted on said guide member, said float member having two longitudinally spaced-apart sealing surfaces for sealingly engaging said sealing wall in a first sealing position in communication with the contents of said container and a second sealing position in communication with said flush tank; and means for mounting said package in said flush tank with said float member downward, whereby said float member will be in said first sealing position when said tank is full and will move to said second sealing position when said tank is emptied, thereby dispensing into said tank a metered quantity of fluid trapped between said first and second sealing surfaces during movement from said first to said second sealing position.

7. The package of claim 6 wherein said stationary guide member includes:

a skirt portion extending into said container; and an inwardly extending flange portion integrally formed with the end of said skirt portion, said sealing wall being attached to the end of said flange portion and extending toward said container opening.

8. The package of claim 6 wherein said float member comprises:

a metering member, slideably engaged in said opening defined by said sealing wall, said metering member including a hollow annular portion with a diameter less than the diameter of said stationary guide member and extending beyond said container opening, a seal portion defining said first sealing surface and forming a fluid tight seal with said sealing wall when said hollow annular portion is moved toward said container opening, thereby defining said first sealing position, and an extension portion projecting beyond said seal portion and being closed to prevent the contents of said container from entering said metering member; and a sealing ring, carried by said extension portion, defining said second sealing surface and forming a fluid tight seal with said sealing wall when said hollow annular portion is moved away from said container opening, thereby defining said second sealing position.

9. The package of claim 8 wherein said float member further includes:

a plurality of longitudinally extending ribs, integrally formed on the periphery of said hollow annular portion and being spaced apart thereon, said ribs extending radially and being in sliding contact with said guide member to thereby control the movement of said float member in response to the rise and fall of the water level in said flush tank.

10. The package of claim 8 wherein said sealing ring further includes:
a stop rib, extending radially beyond said second sealing surface, positioned to engage said sealing wall at said second sealing position and thereby prevent further movement of said float member beyond said second sealing position.

11. The package of claim 8 wherein said metering member further includes:
a stop ledge, connecting said hollow annular portion and said seal portion, for engaging said sealing wall at said first sealing position and thereby prevent further movement of said float member beyond said first sealing position.

12. The package of claim 6 wherein said neck portion includes an externally threaded finish portion, and which further includes:
a closure having an interiorly threaded depending skirt integrally connected with a disc portion, said closure being threadably engaged with said finish portion, said disc portion contacting said float member and holding said float member in said first sealing position until said closure is removed to allow dispensing of the contents of said container.

13. In a package for dispensing metered quantities of a fluid into a toilet flush tank wherein said fluid is held within a container and wherein said package includes a movable member carried by said container and said member's position is dictated by the level of water in said flush tank and reciprocates between an upper position when said tank is filled and a lower position when said tank is emptied, the improvement in said package which comprises:
means for trapping and dispensing a measured quantity of said fluid during movement of said movable member from said upper to said lower position, said dispensing occurring as said movable member reaches said lower position.

* * * * *

Notice of Adverse Decision in Interference

In Interference No. 99,702 involving Patent No. 3,908,209, W. E. Fillmore, FLUID DISPENSING APPARATUS, final judgment adverse to the patentee was rendered June 16, 1978, as to claims 1, 3–8 and 10–13.

[*Official Gazette October 17, 1978.*]